US011683484B2

(12) United States Patent
Chaudhari et al.

(10) Patent No.: US 11,683,484 B2
(45) Date of Patent: Jun. 20, 2023

(54) SYSTEMS AND METHODS FOR DYNAMIC EARLY TERMINATION OF MODE DECISION IN HARDWARE VIDEO ENCODERS

(71) Applicant: Meta Platforms, Inc., Menlo Park, CA (US)

(72) Inventors: Gaurang Chaudhari, Sunnyvale, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/488,158

(22) Filed: Sep. 28, 2021

(65) Prior Publication Data
US 2023/0100352 A1 Mar. 30, 2023

(51) Int. Cl.
*H04N 19/107* (2014.01)
*H04N 19/147* (2014.01)
(Continued)

(52) U.S. Cl.
CPC ........ *H04N 19/107* (2014.11); *H04N 19/147* (2014.11); *H04N 19/159* (2014.11); *H04N 19/186* (2014.11)

(58) Field of Classification Search
CPC .. H04N 19/107; H04N 19/147; H04N 19/159; H04N 19/186
See application file for complete search history.

(56) References Cited

U.S. PATENT DOCUMENTS

| | | | |
|---|---|---|---|
| 9,479,786 B2* | 10/2016 | Lu | H04N 19/127 |
| 2009/0110066 A1 | 4/2009 | Wang et al. | |
| 2011/0051811 A1* | 3/2011 | Wang | H04N 19/11 375/E7.243 |

FOREIGN PATENT DOCUMENTS

| | | | |
|---|---|---|---|
| EP | 2899975 A1 | 7/2015 | |
| WO | WO-2022061613 A1 * | 3/2022 | |

OTHER PUBLICATIONS

Xiaofeng Huang et al., "Fast Algorithms and VLSI Architecture Design for HEVC Intra-Mode Decision"; Real-Time Image Processing; DOI 10.1007/s11554-015-0549-8, May 14, 2015 © SpringerVerlag, Berlin (Year: 2015).*

(Continued)

*Primary Examiner* — Dramos Kalapodas
(74) *Attorney, Agent, or Firm* — Greenberg Traurig, LLP

(57) ABSTRACT

An example system may include a primary mode decision module, included in a hardware video encoding pipeline, that (1) receives video data for encoding in accordance with a video encoding standard, and (2) identifies, from an initial set of prediction modes supported by the video encoding standard, a primary set of prediction modes for encoding the video data in accordance with the video encoding standard. The example system may also include a secondary mode decision module that (1) determines, for each prediction mode included in the primary set of prediction modes and based on the video data, a cost associated with the prediction mode, and (2) selects, from the primary set of prediction modes and based on the determined costs associated with the prediction modes included in the primary set of prediction modes, a prediction mode for encoding of the video data by the hardware video encoding pipeline.

20 Claims, 5 Drawing Sheets

(51) Int. Cl.
*H04N 19/186* (2014.01)
*H04N 19/159* (2014.01)

(56) References Cited

OTHER PUBLICATIONS

Cetinkaya E., et al., "CTU Depth Decision Algorithms for HEVC: A Survey," Signal Processing: Image Communication, vol. 99, Aug. 20, 2021, 22 pages.
Huang X., et al., "Fast algorithms and VLSI Architecture Design for HEVC Intra-Mode Decision," Journal of Real-Time Imageprocessing, vol. 12, No. 2, Dec. 16, 2015, 18 pages.
International Search Report and Written Opinion for International Application No. PCT/US2022/044635, dated Dec. 20, 2022, 12 pages.
Kim D-H., et al., "Selective CU Depth Range Decision Algorithm for HEVC Encoder," The 18th IEEE International Symposium on Consumer Electronics, Jun. 25, 2014, 2 pages.
Zhu S., et al., "Adaptive Fast Intra Prediction for High Efficiency Video Coding," Multimedia Tools and Applications, vol. 75, No. 13, May 14, 2015, 15 pages.

\* cited by examiner

SYSTEMS AND METHODS FOR DYNAMIC EARLY TERMINATION OF MODE DECISION IN HARDWARE VIDEO ENCODERS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
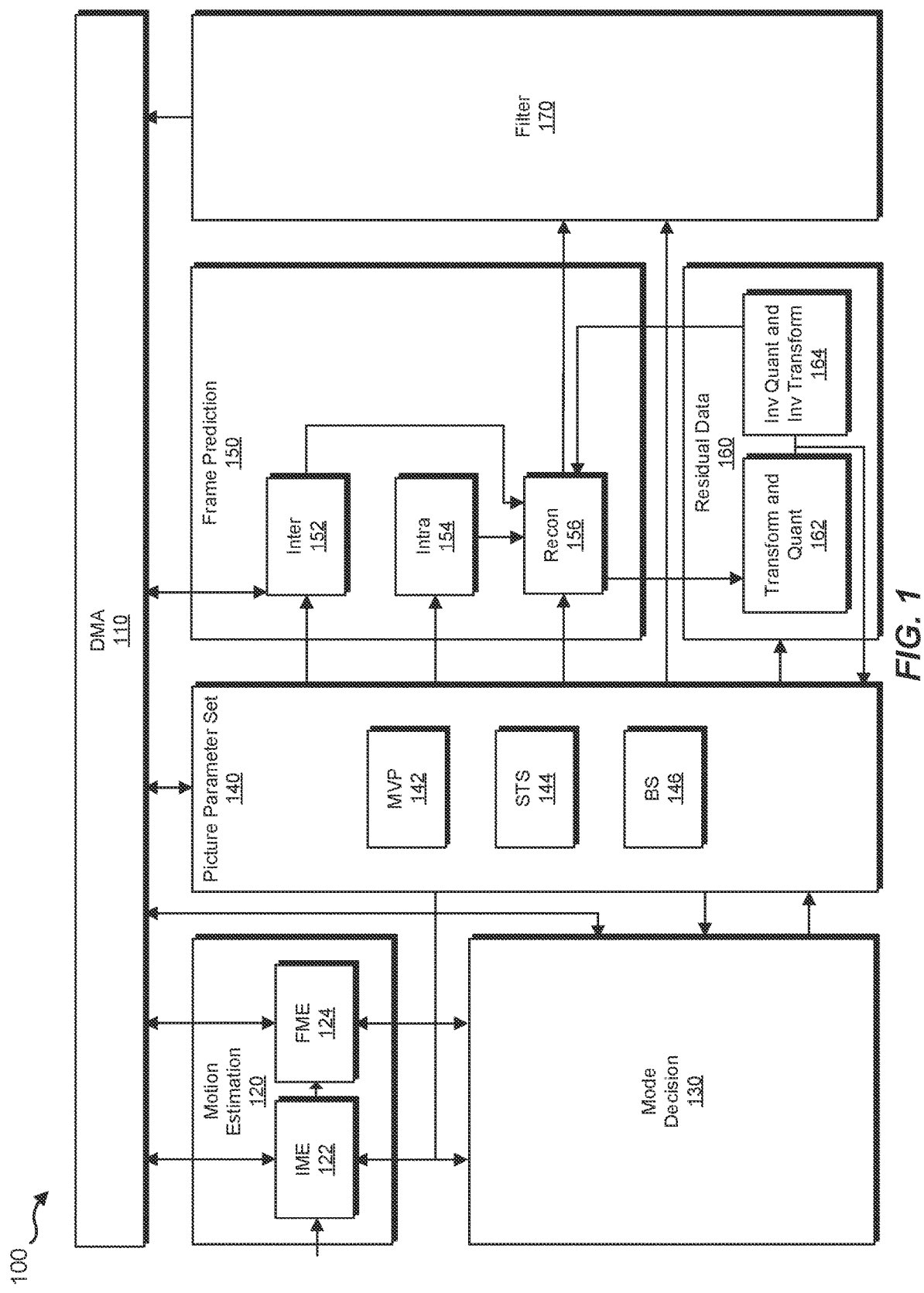
FIG. 1 is a block diagram of an example hardware video encoding pipeline in accordance with some embodiments described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern video encoding standards, such as Advanced Video Coding (AVC)/H.264, High Efficiency Video Codec (HEVC)/H.265, AOMedia Video 1 (AV1), VP9, and so forth are generally based on hybrid coding frameworks that may compress video data by exploiting redundancies within the video data. Compression may be achieved by identifying and storing only differences within the video data, such as may occur between temporally proximate frames (i.e., inter-frame coding) and/or between spatially proximate pixels (i.e., intra-frame coding). Inter-frame compression uses data from one or more earlier or later frames in a sequence to describe a current frame. Intra-frame coding, on the other hand, uses only data from within the current frame to describe the current frame.

Modern video encoding standards may additionally employ compression techniques like quantization that may exploit perceptual features of human vision, such as by eliminating, reducing, and/or more heavily compressing aspects of source video data that may be less relevant to human visual perception than other aspects. For example, as human vision may generally be more sensitive to changes in brightness than changes in color, a video encoder using a particular video codec may use more data on average to encode changes in luminance than changes in color. In all, video encoders must balance various trade-offs between video quality, bit rate, processing costs, and/or available system resources to effectively encode and/or decode video data.

Some approaches to making encoding decisions may involve simply choosing a result that yields the highest quality output image according to some quality standard. However, such methods may choose settings that may require more bits to encode video data while providing comparatively little quality benefit. As an example, during a motion estimation portion of an encoding process, adding extra precision to representation of motion vectors of blocks might increase quality of an encoded output video, but the increase in quality might not be worth the extra bits necessary to encode the motion vectors with a higher precision.

As an additional example, during a basic encoding process, an encoder may divide each frame of video data into processing units. Depending on the codec, these processing units may be referred to as macroblocks (MB), coding units (CU), coding tree units (CTU), and so forth. Modern codecs may select a particular mode (i.e., a processing unit size and/or shape) from among several available modes for encoding video data. This mode decision may greatly impact an overall rate-distortion result for a particular output video file. Mode decision may be one of the computationally complex operations included in a conventional video encoding pipeline and may have a significant impact on the quality of encoded video data. Furthermore, new codecs with possibly higher quality versus compression trade-offs may also require more computing resources to search through more possible modes. For example, in VP9, there may be a recursive four-way partition from sixty-four pixels by sixty-four pixels down to four pixels by four pixels whereas, in an AV1 video encoding standard, there may be a ten-way partition from 128×128 pixels down to four by four pixels.

One possible way of alleviating this complexity is by applying fast encoding algorithms or early terminations to reduce the search space that must be evaluated during mode decision. Such methods may generally be categorized into 2 types: static and dynamic. Static methods may be typically based on statistics from various sources such as frame level, a first encoding pass, motion search, video characteristics, and so forth. A video encoder may trigger a dynamic method when evaluating a particular macroblock of video data. If a selected mode meets a particular cost threshold (e.g., rdcost), the video encoder may dynamically terminate the mode decision process without evaluating other modes.

While static or statistics-based early termination methods may be relatively straightforward to implement in hardware, dynamic early termination methods may be difficult or impractical to implement in hardware. Such methods may also be difficult to implement in hardware while meeting predetermined power-performance throughput goals, especially in high clock speed (e.g., 1+ GHz) systems. Hence, the instant application identifies and addresses a need for improved systems and methods for dynamic early termination of mode decision in hardware video encoders.

The present disclosure is generally directed to systems and methods for dynamic early termination of mode decision in hardware video encoders. As will be explained in greater detail below, embodiments of the instant disclosure may include a primary mode decision module, included in a hardware video encoding pipeline, that (1) receives video data for encoding in accordance with a video encoding standard supported by the hardware video encoding pipeline, and (2) identifies, from an initial set of prediction modes supported by the video encoding standard, a primary set of prediction modes for encoding the video data in accordance with the video encoding standard. Embodiments may also include a secondary mode decision module, included in the hardware video encoding pipeline, that (1) determines, for each prediction mode included in the primary set of prediction modes and based on the video data, a cost associated with the prediction mode, (2) selects, from the primary set of prediction modes and based on the determined costs associated with the prediction modes included in the primary set of prediction modes, a prediction mode for encoding of the video data by the hardware video encoding pipeline.

By cascading mode decision modules, the systems and methods described herein may implement various dynamic early termination methods. For example, the primary mode decision module may make a preliminary evaluation regarding partition sizes/modes for a particular block of video data, thereby pruning a total number of prediction modes for the secondary mode decision module to evaluate in making a final mode decision for the block of video data.

The following will provide, with reference to FIGS. 1-4, detailed descriptions of systems for dynamic early termination of mode decision in hardware video encoders. Detailed descriptions of corresponding computer-implemented methods will also be provided in connection with FIG. 5.

FIG. 1 is a block diagram of an example video encoding pipeline (system 100) that may support dynamic early termination of mode decision as described herein. The blocks and/or modules included in FIG. 1 may illustrate procedures, tasks, and/or processes that may be executed by one or more portions of the video encoding pipeline to support encoding of video data in accordance with a video encoding standard supported by the video encoding pipeline. One or more of these modules may also represent all or portions of one or more special-purpose electronic devices (i.e., hardware devices) configured to perform one or more tasks.

As shown, system 100 may include a direct memory access module 110 (DMA 110) that may store and/or access any suitable video data for encoding by the video encoding pipeline. Additionally, system 100 may include a motion estimation block 120 that may perform one or more tasks to determine one or more motion vectors that may describe a transformation from one video frame to another video frame. Motion estimation block 120 may access and/or generate integer motion estimation data (IME 122) and/or fractional motion estimation data (FME 124) and may communicate that motion estimation data to mode decision block 130. Mode decision block 130 may, as will be described in greater detail below, perform one or more tasks to select, identify, and/or determine a suitable mode for encoding of video data. As described herein, mode decision block 130 may support dynamic early termination of one or more mode decision processes.

As further shown in FIG. 1, system 100 may also include and/or may access a picture parameter set (PPS) 140 (PPS 140). In some examples, PPS 140 may include information that may be useful for encoding video data, such as a resolution of video data, a frame rate of video data, and so forth. In some examples, PPS 140 may include one or more parameters that may apply to encoding and/or decoding of one or more individual pictures inside a coded video sequence. For example, as shown in FIG. 1, PPS 140 may include, without limitation, motion vector prediction data 142 (MVP 142), status data 144 (STS 144), and/or boundary strength data 146 (BS 146).

At frame prediction 150, one or more processes may be applied to video data to predict one or more portions of video data. As shown, frame prediction 150 may include inter-prediction 152 (inter 152), intra-prediction 154 (intra 154), and reconstruction 156 (recon 156). Inter 152 may represent one or more processes that may predict changes between frames of video data and intra 154 may represent one or more processes that may predict changes within a frame of video data. Reconstruction 156 may represent one or more processes that may reconstruct video data from intra-predicted and/or intra-predicted video data.

At residual data 160, one or more processes may be applied to determine, analyze, and/or encode residual frame data. In some video encoding algorithms, residual data (also referred to as "residual frames" or "residual frame data") may be formed by subtracting a reference frame from a desired frame. This residual data may have less information entropy, due to nearby video frames having similarities, and therefore may require fewer bits to compress. The residual data may then be transformed and/or quantized in accordance with a video encoding standard (e.g., at "transform and quant 162") and/or inversely quantized and inversely transformed in accordance with the video encoding standard (e.g., at "inv quant and inv transform 164"). At filter 170, one or more video filters (e.g., deblocking filters) may be applied to video data.

Figure 2:
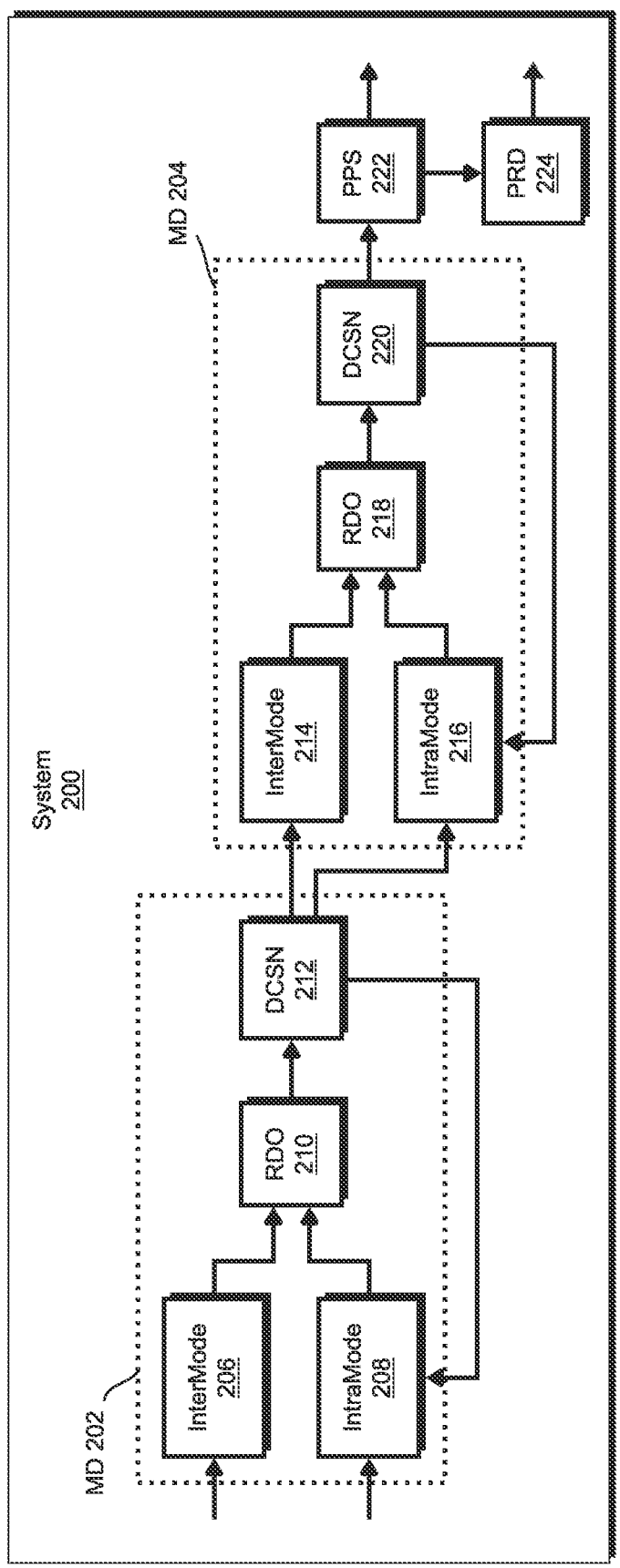
FIG. 2 is a block diagram of a mode decision module that supports dynamic early termination in accordance with some embodiments described herein.

FIG. 2 is a block diagram of an example system 200 that may illustrate a mode decision system that supports dynamic early terminations as described herein. Example system 200 may be included in a hardware video encoding pipeline such as illustrated in FIG. 1 (e.g., as mode decision 130). As shown, example system 200 includes a primary mode decision module 202 (MD 202) and a secondary mode decision module 204 (MD 204). Although not shown in FIG. 1, example system 200 may be included in a hardware video encoding pipeline. The hardware video encoding pipeline may support a video encoding standard such as, without limitation, AVC/H.264, HEVC/H.265, VP9, AV1, and so forth. Each of MD 202 and MD 204 may include one or more modules for performing one or more tasks in a mode decision method supported by the video encoding standard supported by the hardware video encoding pipeline.

As shown in FIG. 2, MD 202 may receive video data, such as integer motion estimation (IME) data and/or fractional motion estimation (FME) data, into an inter prediction mode module 206 (intermode 206) and/or an intra prediction mode module 208 (intramode 208). In some examples, intermode 206 may select, from an initial set of prediction modes supported by the video encoding standard, an inter-prediction mode for received video data, and may encode a portion of received video data using the selected inter-prediction mode. Additionally, intramode 208 may select, from the initial set of prediction modes supported by the video encoding standard, an intra prediction mode for received video data, and may encode a portion of received video data using the selected intra prediction mode.

MD 202 may then pass the encoded video data to rate-distortion optimization (RDO) module 210 (RDO 210). RDO 210 may determine a cost (e.g., a rdcost) associated with encoding video data using the selected prediction mode (e.g., in accordance with an RDO process supported by the video encoding standard). Decision module 212 (DCSN 212) may then determine whether the cost associated with encoding video data using the prediction mode meets a predetermined threshold (e.g., a rdcost threshold). Based on whether the cost associated with encoding video data using the prediction mode meets the predetermined threshold, MD 202 may identify one or more prediction modes to include in a primary set of prediction modes for encoding video data in accordance with the video encoding standard. Likewise, based on whether the cost associated with encoding video data using the prediction mode meets the predetermined threshold, MD 202 may identify one or more prediction modes to exclude from the primary set of prediction modes. MD 202 may then pass the primary set of prediction modes, along with received video data, to MD 204.

MD 204 may execute one or more similar operations as MD 202 to select a prediction mode from the primary set of prediction modes, based on the determined costs associated with the primary set of prediction modes, for encoding of the video data by the hardware video encoding pipeline. For example, MD 204 may receive video data, such as IME data and/or FME data, into an inter-prediction mode module 214 (intermode 214) and/or an intra-prediction mode module 216 (intramode 216). In some examples, intermode 214 may select, from the preliminary set of prediction modes, an inter prediction mode for received video data, and may encode a portion of received video data using the selected inter prediction mode. Additionally, intramode 216 may select, from the primary set of prediction modes, an intra prediction mode for received video data, and may encode a portion of received video data using the selected intra prediction mode.

MD 204 may then pass the encoded video data to RDO module 218 (RDO 218). RDO 218 may determine a cost (e.g., a rdcost) associated with encoding video data using the selected prediction mode (e.g., in accordance with an RDO process supported by the video encoding standard). Decision module 220 (DCSN 220) may then select, based on the determined costs associated with the prediction modes included in the primary set of prediction modes, a prediction mode for encoding of the video data by the hardware video encoding pipeline. As further shown in FIG. 1, system 200 may also include picture parameter set 222 (PPS 222) and power rate distortion 224 (PRD 224). In some examples, one or more of MD 202 and/or MD 204 may further base a mode decision on PPS 222 and/or PRD 224.

By allowing a primary mode decision module (e.g., MD 202) to make a preliminary decision regarding one or more prediction modes, and then allowing a secondary mode decision module (e.g., MD 204) to then evaluate a possibly smaller set of prediction modes, the systems and methods described herein may effectively implement dynamic early terminations in hardware. Some examples dynamic early termination methods that may be supported by this architecture may include directing the secondary mode decision module to skip a rectangular partition test when the primary mode decision module determines that a partition type of none receives a better rdcost than a partition type of split. Additional examples may include, without limitation, early breakout thresholds for partition searches, terminating partition searches for child partitions when NONE and SPLIT partition costs meet a threshold (e.g., INT64_ MAX), pruning of an AB partition search using split and horizontal/vertical information, disabling extended partition searches for lower block sizes based on a threshold value, pruning of extended partition type searches, and/or pruning of ratio (e.g., 1:4) partition searches based on a cost of a split partition search.

Additionally, in some examples, a primary mode decision module (e.g., MD 202) and a secondary mode decision module (e.g., MD 204) may divide mode decision tasks for a set of video data in any suitable way. For example, while MD 204 is evaluating a first component of a superblock (e.g., a luma component of the superblock), MD 202 may evaluate a second component of the superblock (e.g., a chroma component of the superblock). As another example, MD 202 may be instructed to evaluate a second superblock (e.g., $sb_{n+1}$) before MD 204 finishes evaluating a first superblock (e.g., $sb_n$). These options may minimize a power-performance throughput, especially in high clock speed (e.g., 1 GHz or greater) hardware video encoding pipelines.

Figure 3:
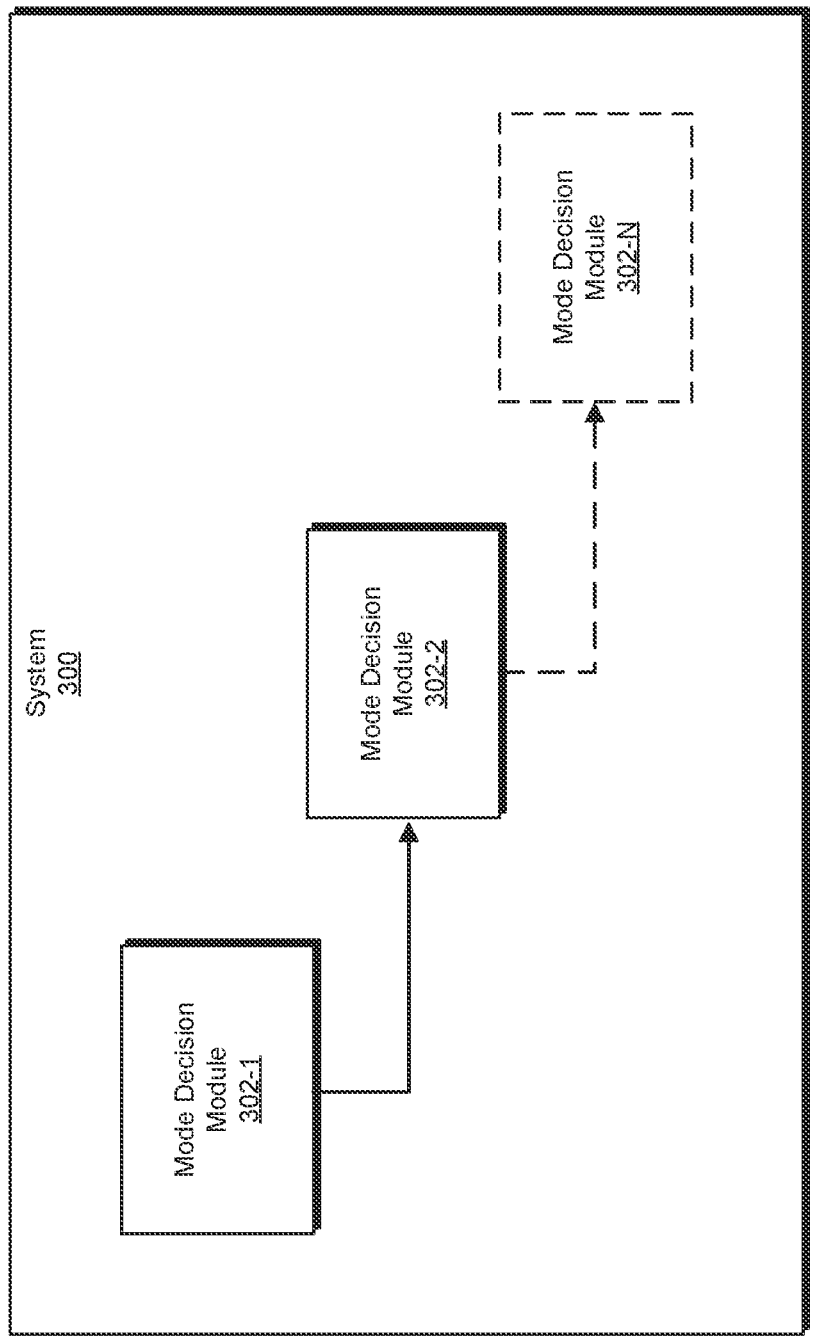
FIG. 3 is a block diagram of a mode decision module that supports dynamic early termination in accordance with some embodiments described herein.

In some embodiments, a plurality of mode decision modules, as described herein, may be arranged in a cascading fashion within a hardware video encoding pipeline to handle complex dynamic based early terminations. For example, FIG. 3 is a block diagram of an additional example hardware video encoding pipeline 300 (system 300) that includes a plurality of cascading mode decision modules 302. As shown, system 300 includes a primary mode decision module 302-1, a secondary mode decision module 302-2, and at least one additional mode decision module 302-N. As this figure shows, implementations of the systems and methods described herein may include any suitable number of mode decision modules (e.g., $MD_0, MD_1, \ldots MD_N$) to support any suitable dynamic early termination methodology.

Figure 4:
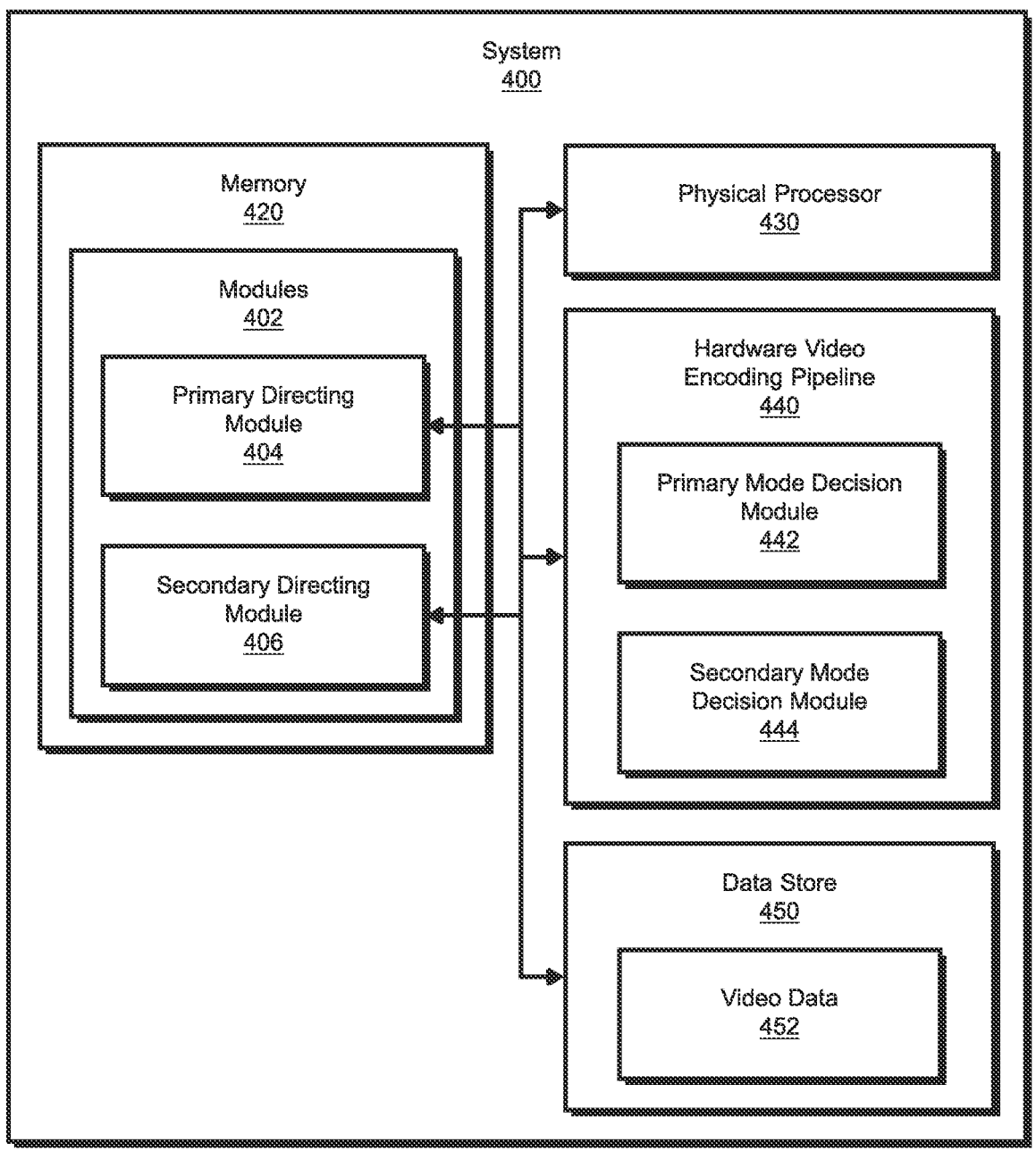
FIG. 4 is a flow diagram of an example system for dynamic early termination of mode decision in hardware video encoders as described herein.

FIG. 4 is a block diagram of an example system 400 for dynamic early termination of mode decision in hardware video encoders. As illustrated in this figure, example system 400 may include one or more modules 402 for performing one or more tasks. In some examples, modules 402 may be included in and/or incorporated as part of one or more control units included in a hardware video encoding pipeline. As will be explained in greater detail below, modules 402 may include a primary directing module 404 that may direct a primary mode decision module (e.g., primary mode decision module 442) included in a hardware video encoding pipeline (e.g., hardware video encoding pipeline 440) to (1) receive video data (e.g., video data 452) for encoding in accordance with a video encoding standard supported by the hardware video encoding pipeline, and (2) identify, from an initial set of prediction modes supported by the video encoding standard, a primary set of prediction modes for encoding the video data in accordance with the video encoding standard. Additionally, modules 402 may include a secondary directing module 406 that may direct a secondary mode decision module (e.g., secondary mode decision module 444) included in the hardware video encoding pipeline to (1) determine, for each prediction mode included in the primary set of prediction modes and based on the video data, a cost associated with the prediction mode, and (2) select, from the primary set of prediction modes and based on the determined costs associated with the prediction modes included in the primary set of prediction modes, a prediction mode for encoding of the video data by the hardware video encoding pipeline.

As further illustrated in FIG. 4, example system 400 may also include one or more memory devices, such as memory 420. Memory 420 generally represents any type or form of volatile or non-volatile storage device or medium capable of storing data and/or computer-readable instructions. In one example, memory 420 may store, load, and/or maintain one or more of modules 402. Examples of memory 420 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Also shown in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 420. Additionally or alternatively, physical processor 430 may execute one or more of modules 402 to facilitate dynamic early termination of mode decision in hardware video encoders. Examples of physical processor 430 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 4, example system 400 may further include one or more data stores, such as data store 450, that may receive, store, and/or maintain data. Data store 450 may represent portions of a single data store or computing device or a plurality of data stores or computing devices. In some embodiments, data store 450 may be a logical container for data and may be implemented in various forms (e.g., a database, a file, a file system, a data structure, etc.). Examples of data store 450 may include, without limitation, files, file systems, data stores, databases, and/or database management systems such as an operational data store (ODS), a relational database, a No SQL database, a NewSQL database, and/or any other suitable organized collection of data. In at least one example, data store 450 may include (e.g., store, host, access, maintain, etc.) video data 452 that may include and/or represent any video data and/or associated parameters, values, data, and so forth that may be used in a video encoding process supported by hardware video encoding pipeline 440.

Figure 5:
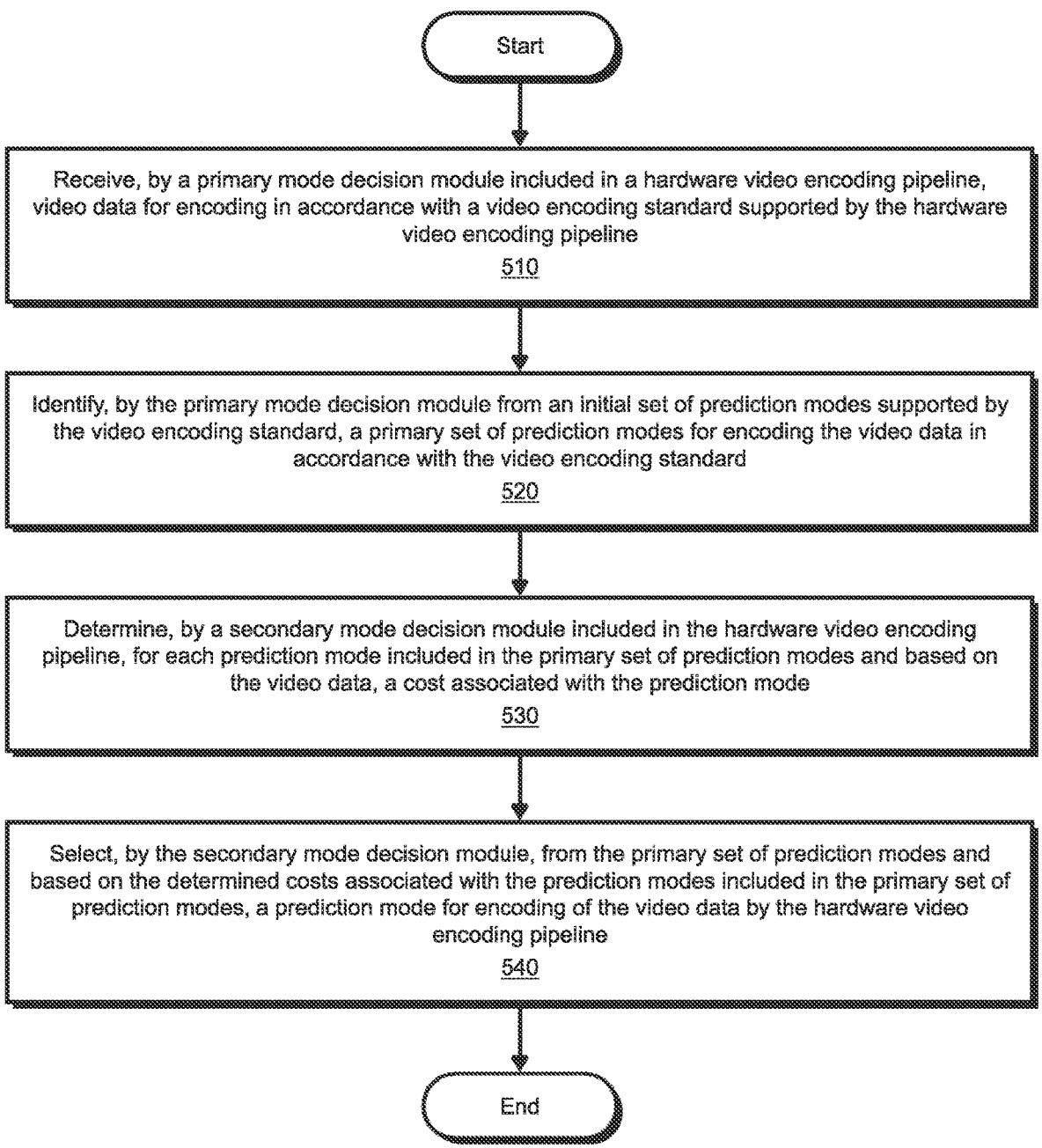
FIG. 5 is a block diagram of an example method for dynamic early termination of mode decision in hardware video encoders.

FIG. 5 is a flow diagram of an example computer-implemented method 500 for dynamic early termination of mode decision in hardware video encoders. The steps shown in FIG. 5 may be performed by any suitable computer-executable code and/or computing system, including system 100 in FIG. 1, system 200 in FIG. 2, system 300 in FIG. 3, system 400 in FIG. 4, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 510, one or more of the systems described herein may receive video data for encoding in accordance with a video encoding standard supported by the hardware video encoding pipeline. For example, primary mode decision module 442 included in hardware video encoding pipeline 440 may receive video data 452 for encoding in accordance with a video encoding standard supported by hardware video encoding pipeline 440. This may be accomplished in any of the ways described herein. For example, primary directing module 404 may direct primary mode decision module 442 included in hardware video encoding pipeline 440 to receive video data 452 for encoding in accordance with a video encoding standard supported by hardware video encoding pipeline 440.

At step 520, one or more of the systems described herein may identify, from an initial set of prediction modes supported by the video encoding standard, a primary set of prediction modes for encoding the video data in accordance with the video encoding standard. For example, primary mode decision module 442 may identify, from an initial set of prediction modes supported by the video encoding standard, a primary set of prediction modes for encoding video data 452 in accordance with the video encoding standard. This may be accomplished in any of the ways described herein. For example, primary directing module 404 may direct primary mode decision module 442 to identify, from an initial set of prediction modes supported by the video encoding standard, a primary set of prediction modes for encoding video data 452 in accordance with the video encoding standard.

At step 530, one or more of the systems described herein may determine, for each prediction mode included in the primary set of prediction modes and based on the video data, a cost associated with the prediction mode. For example, secondary mode decision module 444 may determine, for each prediction mode included in the primary set of prediction modes and based on the video data, a cost associated with the prediction mode. This may be accomplished in any of the ways described herein. For example, secondary directing module 406 may direct secondary mode decision module 444 included in hardware video encoding pipeline 440 to determine, for each prediction mode included in the primary set of prediction modes and based on the video data, a cost (e.g., a rdcost) associated with the prediction mode.

At step 540, one or more of the systems described herein may select, from the primary set of prediction modes and based on the determined costs associated with the prediction modes included in the primary set of prediction modes, a prediction mode for encoding of the video data by the hardware video encoding pipeline. For example, secondary mode decision module 444 included in hardware video encoding pipeline 440 may select, from the primary set of prediction modes and based on the determined costs associated with the prediction modes included in the primary set of prediction modes, a prediction mode for encoding of the video data by the hardware video encoding pipeline. This may be accomplished in any of the ways described herein. For example, secondary directing module 406 may direct secondary mode decision module 444 to select, from the primary set of prediction modes and based on the determined costs associated with the prediction modes included in the primary set of prediction modes, a prediction mode for encoding of the video data by the hardware video encoding pipeline.

As discussed throughout the instant disclosure, the disclosed systems and methods may provide one or more advantages over traditional options for mode decision. By cascading mode decision modules, the systems and methods described herein may implement various dynamic early termination methods. For example, the primary mode decision module may make a preliminary evaluation regarding partition sizes/modes for a particular block of video data, thereby pruning a total number of prediction modes for the secondary mode decision module to evaluate in making a final mode decision for the block of video data.

The systems and methods described herein may support various dynamic early terminations including, without limitation, skipping of a rectangular partition test when a partition type of NONE gives a better rdcost than a partition type of SPLIT; partition search early breakout thresholds; termination of partition search for a child partition when partitions of NONE and SPLIT costs meet a maximum value (e.g., INT64_ MAX); pruning of AB partition search using SPLIT and HORZ/VERT information; disabling of extended partition searches for lower block sizes based on a predetermined threshold cost; pruning of an extended partition types search; and/or pruning of a 1:4 partition search based on winner information from split partitions.

EXAMPLE EMBODIMENTS

Example 1: A system comprising (1) a primary mode decision module, included in a hardware video encoding pipeline, that (a) receives video data for encoding in accordance with a video encoding standard supported by the hardware video encoding pipeline, and (b) identifies, from an initial set of prediction modes supported by the video encoding standard, a primary set of prediction modes for encoding the video data in accordance with the video encoding standard, (2) a secondary mode decision module, included in the hardware video encoding pipeline, that (a) determines, for each prediction mode included in the primary set of prediction modes and based on the video data, a cost associated with the prediction mode, and (b) selects, from the primary set of prediction modes and based on the determined costs associated with the prediction modes included in the primary set of prediction modes, a prediction mode for encoding of the video data by the hardware video encoding pipeline.

Example 2: The system of example 1, wherein the primary mode decision module comprises (1) a primary rate-distortion optimization module that determines costs associated with encoding video data using prediction modes, and (2) a primary decision module that determines whether a cost associated with encoding video data using a prediction mode meets a predetermined threshold.

Example 3: The system of any of examples 1 and 2, wherein the secondary mode decision module comprises (1) a secondary rate-distortion optimization module that determines costs associated with encoding video data using prediction modes, and (2) a secondary decision module that determines whether a cost associated with encoding video data using a prediction mode meets a predetermined threshold.

Example 4: The system of any of examples 1-3, wherein the primary mode decision module receives additional video data for encoding in accordance with the video encoding standard while the secondary mode decision module at least one of (1) determines, for each prediction mode included in the primary set of prediction modes and based on the video data, the cost associated with the prediction mode, or (2) selects, from the primary set of prediction modes and based on the determined costs associated with the prediction modes included in the primary set of prediction modes, the prediction mode for encoding of the video data by the hardware video encoding pipeline.

Example 5: The system of any of examples 1-4, wherein the primary mode decision module identifies, from the initial set of prediction modes supported by the video encoding standard, a secondary set of prediction modes for encoding additional video data in accordance with the video encoding standard, while the secondary mode decision module at least one of (1) determines, for each prediction mode included in the primary set of prediction modes and based on the video data, the cost associated with the prediction mode, or (2) selects, from the primary set of prediction modes and based on the determined costs associated with the prediction modes included in the primary set of prediction modes, the prediction mode for encoding of the video data by the hardware video encoding pipeline.

Example 6: The system of any of examples 1-5, wherein the hardware video encoding pipeline further encodes the video data using the selected prediction mode.

Example 7: The system of any of examples 1-6, wherein the primary mode decision module identifies the primary set of prediction modes by, for at least a portion of the initial set of prediction modes (1) determining, for each prediction mode included in the portion of the initial set of prediction modes, a cost associated with the prediction mode, and (2) including a prediction mode in the primary set of prediction modes when the cost associated with the prediction mode meets a predetermined threshold.

Example 8: The system of any of examples 1-7, wherein at least one prediction mode included in the initial set of prediction modes comprises an inter prediction partition mode.

Example 9: The system of any of examples 1-8, wherein at least one prediction mode included in the initial set of prediction modes comprises an intra prediction mode.

Example 10: The system of any of examples 1-9, wherein at least one prediction mode included in the initial set of prediction modes comprises at least one of (1) a luma prediction mode, or (2) a chroma prediction mode.

Example 11: The system of any of examples 1-10, wherein the video encoding standard comprises at least one of (1) an Advanced Video Coding (AVC)/H.264 video encoding standard, (2) a High Efficiency Video Coding (HEVC)/H.265 video encoding standard, (3) a VP9 video encoding standard, or (4) an AOMedia Video 1 (AV1) video encoding standard.

Example 12: A method comprising (1) receiving, by a primary mode decision module included in a hardware video encoding pipeline, video data for encoding in accordance with a video encoding standard supported by the hardware video encoding pipeline, and (2) identifying, by the primary mode decision module from an initial set of prediction modes supported by the video encoding standard, a primary set of prediction modes for encoding the video data in accordance with the video encoding standard, (3) determining, by a secondary mode decision module included in the hardware video encoding pipeline, for each prediction mode included in the primary set of prediction modes and based on the video data, a cost associated with the prediction mode, and (4) selecting, by the secondary mode decision module, from the primary set of prediction modes and based on the determined costs associated with the prediction modes included in the primary set of prediction modes, a prediction mode for encoding of the video data by the hardware video encoding pipeline.

Example 13: The method of example 12, further comprising receiving, by the primary mode decision module, additional video data for encoding in accordance with the video encoding standard while the secondary mode decision module at least one of (1) determines, for each prediction mode included in the primary set of prediction modes and based on the video data, the cost associated with the prediction mode, or (2) selects, from the primary set of prediction modes and based on the determined costs associated with the prediction modes included in the primary set of prediction modes, the prediction mode for encoding of the video data by the hardware video encoding pipeline.

Example 14: The method of any of examples 12 and 13, further comprising identifying, by the primary mode decision module from the initial set of prediction modes supported by the video encoding standard, a secondary set of prediction modes for encoding additional video data in accordance with the video encoding standard, while the secondary mode decision module at least one of (1) determines, for each prediction mode included in the primary set of prediction modes and based on the video data, the cost associated with the prediction mode, or (2) selects, from the primary set of prediction modes and based on the determined costs associated with the prediction modes included in the primary set of prediction modes, the prediction mode for encoding of the video data by the hardware video encoding pipeline.

Example 15: The method of any of examples 12-14, further comprising encoding, by the hardware video encoding pipeline, the video data using the selected prediction mode.

Example 16: The method of any of examples 12-15, wherein identifying the primary set of prediction modes comprises, for at least a portion of the initial set of prediction modes, (1) determining, for each prediction mode included in the portion of the initial set of prediction modes, a cost associated with the prediction mode, and (2) including a prediction mode in the primary set of prediction modes when the cost associated with the prediction mode meets a predetermined threshold.

Example 17: The method of any of examples 12-16, wherein selecting the prediction mode for encoding of the video data by the hardware video encoding pipeline comprises (1) identifying a prediction mode from the primary set of prediction modes having a cost that meets a predetermined threshold, and (2) selecting the identified prediction mode.

Example 18: The method of any of examples 12-17, wherein at least one prediction mode included in the initial set of prediction modes comprises an inter prediction mode.

Example 19: The method of any of examples 12-18, wherein at least one prediction mode included in the initial set of prediction modes comprises an intra prediction mode.

Example 20: A non-transitory computer-readable medium comprising computer-readable instructions that, when executed by at least one processor of a computing system, cause the computing system to (1) direct a primary mode decision module included in a hardware video encoding pipeline to (a) receive video data for encoding in accordance with a video encoding standard supported by the hardware video encoding pipeline, and (b) identify, from an initial set of prediction modes supported by the video encoding standard, a primary set of prediction modes for encoding the video data in accordance with the video encoding standard, and (2) direct a secondary mode decision module included in the hardware video encoding pipeline to (a) determine, for each prediction mode included in the primary set of prediction modes and based on the video data, a cost associated with the prediction mode, and (b) select, from the primary set of prediction modes and based on the determined costs associated with the prediction modes included in the primary set of prediction modes, a prediction mode for encoding of the video data by the hardware video encoding pipeline.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers or computing devices configured to perform one or more tasks.

In addition, one or more of the modules described herein may transform data, physical devices, and/or representations of physical devices from one form to another. For example, one or more of the modules recited herein may receive video data to be transformed, transform the video data, output a result of the transformation to encode the video data, use the result of the transformation to present the encoded video data, and store the result of the transformation to later present the encoded video data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "processor" or "physical processor," as used herein, generally refers to or represents any type or form of hardware-implemented processing unit capable of interpreting and/or executing computer-readable instructions. In one example, a physical processor may access and/or modify one or more of the modules described herein. Additionally or alternatively, a physical processor may execute one or more of the modules described herein to facilitate one or more RDO processes. Examples of a physical processor include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

The term "memory," as used herein, generally refers to or represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of."Finally, for ease of use, the terms "including" and "having" (and their derivatives), as used in the specification and claims, are interchangeable with and have the same meaning as the word "comprising."

What is claimed is:

1. A system comprising:
   a primary mode decision module, included in a set of cascading mode decision modules in a hardware video encoding pipeline, that, during a mode decision process associated with an initial set of prediction modes supported by a video encoding standard:
   receives video data for encoding in accordance with e-the video encoding standard;
   identifies, from the initial set of prediction modes, a primary set of prediction modes for encoding the video data in accordance with the video encoding standard by:
   determining, via a primary rate-distortion optimization module included in the primary mode decision module, for each prediction mode included in the initial set of prediction modes, a primary cost associated with encoding the video data using the prediction mode; and
   dynamically terminating the mode decision process as to the prediction mode by excluding the prediction mode from the primary set of prediction modes when the primary cost associated with the prediction mode meets a predetermined primary cost threshold; and
   a secondary mode decision module, included in the set of cascading mode decision modules in the hardware video encoding pipeline, that:
   determines, for each prediction mode included in the primary set of prediction modes and based on the video data, a secondary cost associated with the prediction mode; and
   selects, from the primary set of prediction modes and based on the determined secondary costs associated with the prediction modes included in the primary set of prediction modes, a prediction mode for encoding of the video data by the hardware video encoding pipeline.

2. The system of claim 1, wherein the primary mode decision module further comprises
   a primary decision module that determines whether the primary cost associated with encoding the video data using the prediction mode meets the predetermined primary cost threshold.

3. The system of claim 1, wherein the secondary mode decision module comprises:
   a secondary rate-distortion optimization module that determines secondary costs associated with encoding video data using prediction modes; and
   a secondary decision module that determines whether a secondary cost associated with encoding video data using a prediction mode meets a predetermined threshold.

4. The system of claim 1, wherein the primary mode decision module receives additional video data for encoding in accordance with the video encoding standard while the secondary mode decision module at least one of:
   determines, for each prediction mode included in the primary set of prediction modes and based on the video data, the secondary cost associated with the prediction mode; or
   selects, from the primary set of prediction modes and based on the determined secondary costs associated with the prediction modes included in the primary set of prediction modes, the prediction mode for encoding of the video data by the hardware video encoding pipeline.

5. The system of claim 1, wherein the primary mode decision module identifies, from the initial set of prediction modes supported by the video encoding standard, a secondary set of prediction modes for encoding additional video data in accordance with the video encoding standard, while the secondary mode decision module at least one of:
   determines, for each prediction mode included in the primary set of prediction modes and based on the video data, the secondary cost associated with the prediction mode; or
   selects, from the primary set of prediction modes and based on the determined secondary costs associated with the prediction modes included in the primary set of prediction modes, the prediction mode for encoding of the video data by the hardware video encoding pipeline.

6. The system of claim 1, wherein the hardware video encoding pipeline further encodes the video data using the selected prediction mode.

7. The system of claim 1, wherein the primary mode decision module identifies the primary set of prediction modes by, for at least a portion of the initial set of prediction modes:
   determining, for each prediction mode included in the portion of the initial set of prediction modes, a primary cost associated with the prediction mode; and
   including a prediction mode in the primary set of prediction modes when the primary cost associated with the prediction mode meets a predetermined threshold.

8. The system of claim 1, wherein at least one prediction mode included in the initial set of prediction modes comprises an inter prediction partition mode.

9. The system of claim 1, wherein at least one prediction mode included in the initial set of prediction modes comprises an intra prediction mode.

10. The system of claim 1, wherein at least one prediction mode included in the initial set of prediction modes comprises at least one of:
    a luma prediction mode; or
    a chroma prediction mode.

11. The system of claim 1, wherein the video encoding standard comprises at least one of:
    an Advanced Video Coding (AVC)/H.264 video encoding standard;

a High Efficiency Video Coding (HEVC)/H.265 video encoding standard;
a VP9 video encoding standard; or
an AOMedia Video 1 (AV1) video encoding standard.

12. A method comprising:
receiving, during a mode decision process associated with an initial set of prediction modes supported by a video encoding standard, by a primary mode decision module included in a set of cascading mode decision modules in a hardware video encoding pipeline, video data for encoding in accordance with the video encoding standard; and
identifying, by the primary mode decision module from the initial set of prediction modes, a primary set of prediction modes for encoding the video data in accordance with the video encoding standard by:
determining, via a primary rate-distortion optimization module included in the primary mode decision module, for each prediction mode included in the initial set of prediction modes, a primary cost associated with encoding the video data using the prediction mode;
determining, by a secondary mode decision module included in the set of cascading mode decision modules in the hardware video encoding pipeline, for each prediction mode included in the primary set of prediction modes and based on the video data, a secondary cost associated with the prediction mode; and
selecting, by the secondary mode decision module, from the primary set of prediction modes and based on the determined secondary costs associated with the prediction modes included in the primary set of prediction modes, a prediction mode for encoding of the video data by the hardware video encoding pipeline.

13. The method of claim 12, further comprising receiving, by the primary mode decision module, additional video data for encoding in accordance with the video encoding standard while the secondary mode decision module at least one of:
determines, for each prediction mode included in the primary set of prediction modes and based on the video data, the secondary cost associated with the prediction mode; or
selects, from the primary set of prediction modes and based on the determined secondary costs associated with the prediction modes included in the primary set of prediction modes, the prediction mode for encoding of the video data by the hardware video encoding pipeline.

14. The method of claim 12, further comprising identifying, by the primary mode decision module from the initial set of prediction modes supported by the video encoding standard, a secondary set of prediction modes for encoding additional video data in accordance with the video encoding standard, while the secondary mode decision module at least one of:
determines, for each prediction mode included in the primary set of prediction modes and based on the video data, the secondary cost associated with the prediction mode; or
selects, from the primary set of prediction modes and based on the determined secondary costs associated with the prediction modes included in the primary set of prediction modes, the prediction mode for encoding of the video data by the hardware video encoding pipeline.

15. The method of claim 12, further comprising encoding, by the hardware video encoding pipeline, the video data using the selected prediction mode.

16. The method of claim 12, wherein selecting the prediction mode for encoding of the video data by the hardware video encoding pipeline comprises:
identifying, by the secondary mode decision module, a prediction mode from the primary set of prediction modes having a secondary cost that meets a predetermined threshold; and
selecting the identified prediction mode.

17. The method of claim 12, wherein at least one prediction mode included in the initial set of prediction modes comprises an inter prediction mode.

18. The method of claim 12, wherein at least one prediction mode included in the initial set of prediction modes comprises an intra prediction mode.

19. A non-transitory computer-readable medium comprising computer-readable instructions that, when executed by at least one processor of a computing system, cause the computing system to:
direct, during a mode decision process associated with an initial set of prediction modes supported by a video encoding standard a primary mode decision module included in a set of cascading decision modules in a hardware video encoding pipeline to:
receive video data for encoding in accordance with the video encoding standard; and
identify, from an initial set of prediction modes supported by the video encoding standard, a primary set of prediction modes for encoding the video data in accordance with the video encoding standard by:
determining, via a primary rate-distortion optimization module included in the primary mode decision module, for each prediction mode included in the initial set of prediction modes, a primary cost associated with encoding the video data using the prediction mode; and
dynamically terminating the mode decision process as to the prediction mode by excluding the prediction mode from the primary set of prediction modes when the primary cost associated with the prediction mode meets a predetermined primary cost threshold; and
direct a secondary mode decision module included in the set of cascading mode decision modules in the hardware video encoding pipeline to:
determine, for each prediction mode included in the primary set of prediction modes and based on the video data, a secondary cost associated with the prediction mode; and
select, from the primary set of prediction modes and based on the determined secondary costs associated with the prediction modes included in the primary set of prediction modes, a prediction mode for encoding of the video data by the hardware video encoding pipeline.

20. The non-transitory computer-readable medium comprising computer-readable instructions of claim 19, wherein the computer-readable instructions, when executed by the at least one processor of the computing system, cause the computing system to direct the primary decision module to receive additional video data for encoding in accordance with the video encoding standard while the secondary mode decision module at least one of:
determines, for each prediction mode included in the primary set of prediction modes and based on the video data, the secondary cost associated with the prediction mode; or
selects, from the primary set of prediction modes and based on the determined secondary costs associated with the prediction modes included in the primary set of prediction modes, the prediction mode for encoding of the video data by the hardware video encoding pipeline.

\* \* \* \* \*